US006933583B2

(12) United States Patent
Kunkee et al.

(10) Patent No.: US 6,933,583 B2
(45) Date of Patent: Aug. 23, 2005

(54) IN-PHASE RF DRIVE OF MACH-ZEHNDER MODULATOR PUSH-PULL ELECTRODES BY USING COUPLED QUANTUM WELL OPTICAL ACTIVE REGION

(75) Inventors: Elizabeth T. Kunkee, Manhattan Beach, CA (US); David V. Forbes, Oregon, WI (US); David C. Scott, Lakewood, CA (US); Timothy A. Vang, San Dimas, CA (US); Wenshen Wang, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/411,873

(22) Filed: Apr. 10, 2003

(65) Prior Publication Data

US 2004/0201008 A1 Oct. 14, 2004

(51) Int. Cl.$^7$ ................................................. G02F 1/35
(52) U.S. Cl. ........................... 257/431; 257/14; 257/21; 385/2; 385/3
(58) Field of Search ............................... 257/14, 21, 22, 257/53, 80, 259, 431; 359/241; 385/1, 2, 3, 40, 122; 398/121

(56) References Cited

U.S. PATENT DOCUMENTS

| 5,402,259 A | 3/1995 | Lembo et al. |
| 5,428,225 A | 6/1995 | Silva et al. |
| 5,647,029 A | 7/1997 | Mihailidi et al. |
| 2002/0071622 A1 | 6/2002 | Betts et al. |

FOREIGN PATENT DOCUMENTS

| EP | 0 674 206 A2 | 9/1995 |
| EP | 0 881 526 A2 | 12/1998 |

OTHER PUBLICATIONS

Chan, Y.C. and Tada, K., "Field Induced Optical Effects in Coupled Quantum Wells," IEEE J. Quantum Electron., vol. 27, No. 5, Mar. 1991, pp. 702–707.*

Cartledge, J.C., "Comparison of effective alpha–parameters for semiconductor Mach–Zehnder optical modulators," Mar. 1998, pp. 372–379, Journal of Lightwave Technology, vol. 16, No. 3.*

Rolland, C. et al., "10 Gbit/s, 1.56 micron multiquantum well InP/InGaAsP Mach–Zehnder optical modulator," Mar. 1993, pp. 471–472, Electronics Letters, vol. 29, No. 5.*

U.S. Appl. No. 10/283,947, filed Oct. 30, 2002, entitled "Quantum–Confined Stark Effect Quantum–Dot Optical Modulator".

C. Thirstrup Refractive Index Modulation based on Excitonic Effects in GaInAs–InP Coupled Asymmetric Quantum Wells, IEEE J. Quantum Electron., vol. 31, No. 6, Jun. 1995, pp. 988–996.

* cited by examiner

*Primary Examiner*—Minhloan Tran
*Assistant Examiner*—Thomas L. Dickey
(74) *Attorney, Agent, or Firm*—John A. Miller; Warn, Hoffmann, Miller & LaLone, P.C.

(57) ABSTRACT

A coupled quantum well Mach-Zehnder modulator that employs a push-pull structure to reduce the modulation voltage. The Mach-Zehnder modulator includes a first arm having a first PIN semiconductor device and a second arm having a second PIN semiconductor device. The intrinsic layers of the PIN devices include a coupled quantum well structure to provide an opposite index of refraction change for different DC bias voltages. An RF signal used to modulate the light beam is applied to the two arms in phase and causes the index of refraction in the intrinsic layers of the two PIN devices to change in opposite directions so that a push-pull type drive is achieved without requiring 180° out-of-phase RF drive signal.

10 Claims, 1 Drawing Sheet

IN-PHASE RF DRIVE OF MACH-ZEHNDER MODULATOR PUSH-PULL ELECTRODES BY USING COUPLED QUANTUM WELL OPTICAL ACTIVE REGION

BACKGROUND OF THE INVENTION

1. Field of the Invention

This invention relates generally to a Mach-Zehnder modulator for modulating an optical beam with an RF signal and, more particularly, to a coupled quantum well Mach-Zehnder modulator for modulating an optical beam with an RF signal employing in-phase RF driven push-pull electrodes.

2. Discussion of the Related Art

Optical modulators are often used to impress an electrical signal onto an optical carrier beam. Optical modulators of this type that operate with low modulations voltages are needed in analog photonic link applications to improve link gain and noise figure. For digital applications, the optical beam is modulated by turning the light beam on and off to differentiate zero bits and one bits. In analog applications, the optical beam is modulated so that the intensity of the light beam is proportional to the amplitude of the RF signal. The present invention deals with analog modulation applications, and has particular application for transmitting RF signals to a satellite and to provide optical correlation for signal processing.

One class of modulators that operate at low modulation voltages are semiconductor modulators that employ PIN semiconductor devices where the optical wave propagates down an active region defined by the intrinsic layer in the device. An RF signal is applied to electrodes in contact with the P and N layers of the device to provide the modulation voltage across the intrinsic layer, where the electrodes define an RF transmission line. The RF signal alters the index of refraction of the intrinsic layer, which acts to change the speed of the light beam propagating therethrough, so as to provide the modulation of the light beam based on the amplitude of the RF signal.

One type of optical modulator that employs PIN semiconductor devices is a Mach-Zehnder modulator (MZM). An MZM employs a Mach-Zehnder interferometer that splits the optical beam being modulated into first and second waveguide arms, where one of the waveguide arms extends through the intrinsic layer of a first PIN semiconductor device and the other waveguide arm extends through the intrinsic layer of a second PIN semiconductor device. The optical beams propagating through the two arms are then recombined in a recombiner, where the two beams constructively or destructively interfere depending on their relative phases. Thus, the manner in which the RF signal alters the index of refraction in the PIN device determines the intensity of the output beam.

Separate electrodes are connected to the N and P layers of the first and second PIN devices to modulate the optical beam propagating therethrough. Conventional semiconductor PIN MZMs typically only use single electrode drives where the second arm of the interferometer is a passive optical waveguide. In other types of MZMs, such as lithium niobate or polymer MZMs, the advantages of employing push-pull modes of operation, known to those killed in the art, have been demonstrated. In the push-pull configuration, typically the RF power delivered to the first arm is applied 180 degrees out-of-phase with the RF power delivered to the second arm. In other words, by applying opposite RF signals to the PIN devices in the two arms, a doubling of the effective RF signal is provided, where the RF signal has an opposite effect on the index of refraction in the intrinsic layers of the device. Thus, less RF power needs to be employed for a particular change in index of refraction. In this case, the change in phase in the two arms are equal and opposite which has the effect of increasing the amplitude modulation of the optical field and eliminating chirp.

The known push-pull MZMs are typically implemented by splitting the input RF power using a 180 degree hybrid power splitter, and then applying the two RF outputs to the two arms of the modulator. However, this technique has the disadvantage of requiring broadband power splitters that must maintain strict phase control over the frequency band of interest. Because these devices use power splitting, the actual improvement in the reduction of the modulation voltage is only a factor of $\sqrt{2}$ over that of the single arm drive modulators.

The $V_\pi$ of a Mach-Zehnder modulator can be decreased by a factor of $\sqrt{2}$ or by a factor of x2, depending on whether an RF power split is required, by driving both arms of the modulator with the RF driving voltage. This improvement in $V_\pi$ does not decrease modulator bandwidth. To date, push-pull electrodes on PIN semiconductor modulators have been driven 180 degrees out-of-phase, so that the retardation of the optical phase front is increased in one arm, while being decreased in the other arm. Lithium Niobate modulators can employ a co-planer electrode structure which enables a single electrode push-pull operation, but PIN semiconductor modulators have not been realized with this type of co-planer electrode. When a conventional RF source is used, driving the electrodes 180 degrees out-of-phase is not simple at high frequencies (GHz) since the methods available for producing the 180 degrees out-of-phase RF signal are not necessarily broadband. Dual RF output drivers are available, typically using MMIC technology, which do produce the two 180 degree out-of-phase signals needed to drive a conventional dual electrode MZM push-pull.

Most Mach-Zehnder modulator designs strive for the greatest amount of the electro-refraction, since digital modulators are designed to turn an optical signal on and off. The performance of analog RF modulators, on the other hand, depend on the slope of the electro-refraction $d(\Delta n)/dV$ in the intrinsic layer. In typical quantum well modulators, the electro-refractive effect is governed by the quantum confined Stark effect (QCSE), in other words, the electro-refraction is quadratic with voltage. Thus, a structure which has a large amount of electro-refraction (good for digital applications), is very similar to the quantum well structure which produces a high slope of the electro-refraction.

What is needed is a PIN Mach-Zehnder modulator that provides a push-pull operation so as to limit the RF voltages, and does not require that applied to the arms of the modulator 180° out of phase with each other. It is therefore an object of the present invention to provide such a Mach-Zehnder modulator.

SUMMARY OF THE INVENTION

In accordance with the teachings of the present invention, a coupled quantum well Mach-Zehnder modulator is disclosed that employs an RF signal that drives push-pull electrodes to reduce the modulation voltage. The Mach-Zehnder modulator includes a first arm having a first PIN semiconductor device and a second arm having a second PIN semiconductor device. The intrinsic layers of the PIN devices include a coupled quantum well structure to provide a reverse index of refraction change for different DC bias voltages. A DC bias is applied to one of the PIN devices so that it operates on a descending slope portion of the electro-refraction to electric field curve of the structure, and another DC bias voltage is applied to the other PIN device so that it operates on an ascending slope portion of the electro-refraction to electric field curve of the structure. The RF signal used to modulate the light beam is applied to the two arms in phase, and causes the index of refraction in the intrinsic layers of the two PIN devices to change in opposite directions so that a push-pull type drive is achieved without changing the phase of the RF driving signal.

Additional objects, features and advantages of the present invention will become apparent from the following description and appended claims, taken in conjunction with the accompanying drawings.

DETAILED DESCRIPTION OF THE PREFERRED EMBODIMENTS

The following discussion of the preferred embodiments directed to a coupled quantum well Mach-Zehnder modulator employing an RF drive of push-pull electrodes is merely exemplary in nature, and is in no way intended to limit the invention or its applications or uses.

Figure 1:
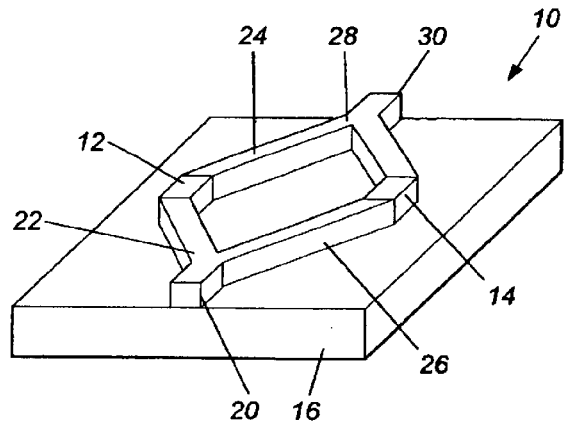
FIG. 1 is a perspective view of a coupled quantum well Mach-Zehnder modulator, according to an embodiment of the present invention.

FIG. 1 is a perspective view of a coupled, quantum well PIN semiconductor Mach-Zehnder modulator (MZM) 10, according to the invention. The MZM 10 includes a first PIN device 12 and a second PIN device 14 spaced apart from each other and formed on a semi-insulating substrate 16. The optical signal to be modulated is applied to an input waveguide 20 that is split by a splitter 22 into a first optical arm 24 and a second optical arm 26. The PIN device 12 is positioned within the optical arm 24 and the PIN device 14 is positioned within the optical arm 26 as shown, so that the light propagates therethrough. The optical signals propagating through the first and second optical arms 24 and 26 are combined by an optical combiner 28 so that the combined optical signal is output on an output waveguide 30. The combination of the input waveguide 20, the splitter 22, the first and second arms 24 and 26, the combiner 28 and the output waveguide 30 make up a Mach-Zehnder interferometer.

Electrodes, discussed below, are employed to provide an electric field across the PIN devices 12 and 14 so as to change the index of refraction of the active region within the intrinsic layers within the PIN devices 12 and 14 to speed up or slow down the optical signal propagating therethrough. Thus, when the split optical signals are combined in the combiner 28, they will constructively or destructively interfere in a desired manner to provide beam intensity modulation. The operation of a Mach-Zehnder modulator as described so far is well understood to those skilled in the art.

Figure 2:
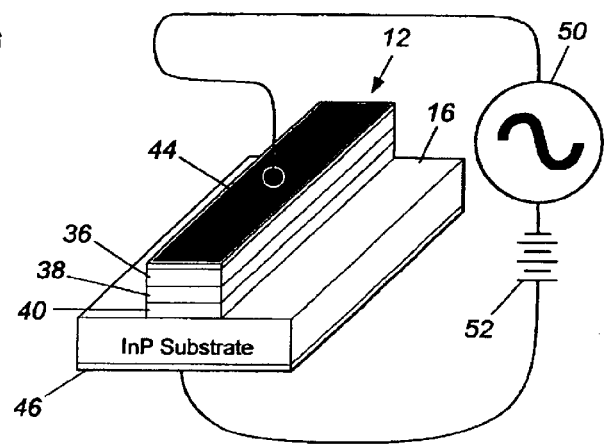
FIG. 2 is a cross-sectional type view of a portion of the Mach-Zehnder modulator shown in FIG. 1.

FIG. 2 is a cross-sectional type view of the PIN device 12 on the substrate 16, and separated from the Mach-Zehnder modulator 10. The PIN device 12 includes a P-type layer 36, an intrinsic layer 38 and an N-type layer 40. The intrinsic layer 38 defines the active waveguide region within the device 12. The PIN device 12 is a conventional semiconductor device, and the substrate 16 and the device layers of the PIN device 12 can be any semiconductor material suitable for the purposes described herein. However, according to the invention, the intrinsic layer 38 includes a coupled quantum well structure for providing a push-pull operation as will become apparent from the discussion below. In one embodiment, the well/barrier configuration of the intrinsic layer 38 can be InGaAs/InP, InGaAsP/InGaAsP, InGaAlAs/InP, GaAs/AlGaAs or InGaAlAs/InGaAlAs. In one particular embodiment, the quantum well structure is a 30 Å InGaAs well, a 50 Å InP barrier, and a 40 Å InGaAs barrier. Other semiconductor materials and thicknesses can also be used.

A first metal electrode 44 is formed on top of the P-type layer 36 opposite the intrinsic layer 38 and is in electrical contact therewith. A second metal electrode 46 is formed on a surface of the substrate 16 opposite to the device 12, as shown. An RF signal from an RF signal source 50 is applied to the electrodes 44 and 46, and a DC bias voltage is applied to the electrodes 44 and 46 from a DC bias source 52.

The PIN device 14 includes the same configuration as the PIN device 12. However, other configurations of these devices can be provided within the scope of the present invention. For example, the N and P layers can be reversed so that the N-layer is on top and the P-layer is in contact with the substrate 16. Additionally, the electrodes can be configured in various ways as long as an electric field is provided across the intrinsic layer 38. According to the invention, a different DC bias is applied to the PIN devices 12 and 14, and the same RF signal is applied to the PIN devices 12 and 14 in phase with each other. The DC bias applied to the PIN devices 12 and 14 provides a set operating point for that device.

An optical signal to be modulated is input into the input waveguide 20 and is split by the splitter 22. The optical signals propagate through the intrinsic layers of the PIN devices 12 and 14, and are recombined by the recombiner 28 to be output on the output waveguide 30. The RF signal to be modulated onto the optical signal from the source 50 is applied to the electrodes 44 and 46 to change the index of refraction of the intrinsic layers within the devices 12 and 14. The change in index of refraction of the intrinsic layers from the RF signal causes the optical beam to slow down or speed up, which changes its phase relative to the optical signal in the other arm of the Mach-Zehnder interferometer. In other words, the RF signal from the source 50 affects the DC bias applied to the electrodes 44 and 46 so that a rise in the RF signal level causes the index of refraction of the intrinsic layers in the devices 12 or 14 to move in one direction, and a fall in the RF signal level causes the index of refraction of the intrinsic layers in the devices 12 or 14 to move in an opposite direction. In a push-pull type MZM, it is desirable to cause the index of refraction of the intrinsic layer of the devices 12 and 14 to move in opposite directions for the same RF signal.

Figure 3:
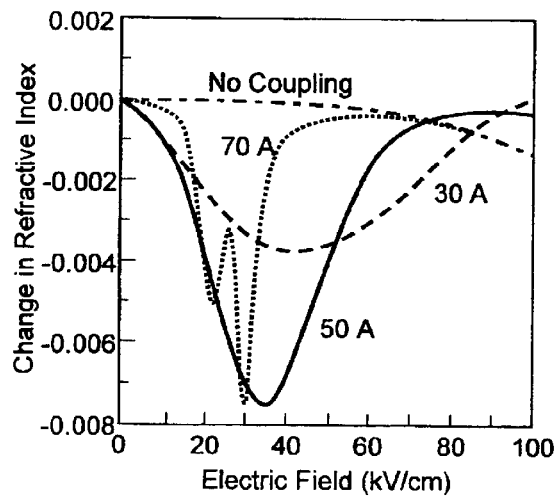
FIG. 3 is a graph with change in index of refraction on the vertical axis and electric field on the horizontal axis showing the calculated electro-refraction curve for coupled quantum well structures having barrier layers of different thicknesses.

FIG. 3 is a graph with change in refractive index on the vertical axis and applied electric field on the horizontal axis showing the electro-refraction relationship for coupled quantum well structures having barrier thicknesses of 30 Å, 50 Å and 70 Å, and for a thick barrier allowing no quantum well coupling. This graph can be found in the article, "Refractive Index Modulation based on Excitonic Effects in GaInAs—InP Coupled Asymmetric Quantum Wells", Carsten Thirstrup, IEEE J. Quantum Electron., Vol. 31, No. 6, June 1995, pp. 988–996. As is apparent, a non-linear change in refractive index at different applied electric fields can be obtained for an appropriate barrier thickness. By providing a coupled quantum well structure in the intrinsic layer of the PIN devices 12 and 14 that has a response to an electric field as shown in FIG. 3, push-pull operation can be realized without having to reverse the RF signal applied to the layers in the devices 12 and 14.

By applying a suitable DC bias signal to one of the PIN devices so that it operates on the descending slope of the line in FIG. 3, and applying a suitable DC bias signal to the other PIN device so that it operates on an ascending slope of the same line, the same RF signal applied to the PIN devices 12 and 14 will cause the index of refraction of the intrinsic layers to change in opposite directions. This gives the push-pull operation. For example, for a barrier thickness of 50 Å, one of the PIN devices would be biased with a DC signal of about 20 kv/cm and the other PIN device would be biased with a DC signal of about 50 kv/cm. A change in the bias signal from the RF signal would cause the index of refraction of the 20 kv/cm biased PIN device to rise or fall, and the same RF signal (in-phase) would cause the index of refraction of the 50 kv/cm biased PIN device to rise or fall in the opposite direction. Therefore, when the RF signal arrives at the PIN devices 12 and 14 at the same point in time, the index of refraction in one of the PIN devices 12 or 14 will increase and the index of refraction of the other PIN devices 12 or 14 will decrease. This change in the index of refraction of the intrinsic layers of the PIN devices 12 and 14 is specifically provided by the quantum well structure in the intrinsic layer, the particular DC bias applied to that device, and whether the RF signal is increasing or decreasing at that point in time.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A semiconductor PIN Mach-Zehnder modulator for modulating an optical signal with an RF signal, said modulator comprising:
    a substrate;
    a first PIN device formed on the substrate and including a P-type layer, an intrinsic layer and an N-type layer, said intrinsic layer of the first PIN device including a coupled quantum well structure, said coupled quantum well structure of the intrinsic layer of the first PIN device having an electro-refraction curve that includes both a positive and negative slope;
    a second PIN device formed on the substrate and including a P-type layer, an intrinsic layer and an N-type layer, said intrinsic layer of the second PIN device including a coupled quantum well structure, said coupled quantum well structure of the intrinsic layer of the second PIN device having an electro-refraction curve that includes both a positive and negative slope;
    a Mach-Zehnder interferometer including a first optical path and a second optical path, said intrinsic layer of the first PIN device being positioned in the first optical path and said intrinsic layer of said second PIN device being positioned in the second optical path; and
    a biasing system, said biasing system including a first DC bias source applying a first DC bias signal to the intrinsic layer of the first PIN device, a second DC bias source providing a second DC bias signal to the intrinsic layer of the second PIN device, and an RF signal source providing the RF signal in phase to the intrinsic layers of the first and second PIN devices, wherein the first DC bias signal causes the first PIN device to operate on one of the positive or negative slope of the electro-refraction curve of the intrinsic layer of the first PIN device so that the RF signal causes the index of refraction of the intrinsic layer of the first PIN device to change in one direction and the second DC bias signal causes the second PIN device to operate on the other of the positive or negative slope of the electro-refraction curve of the intrinsic layer of the second PIN device so that the RF signal causes the index of refraction of the intrinsic layer of the second PIN device to change in an opposite direction at a particular point in time so that the modulator operates in a push-pull manner, wherein the first and second DC bias signals are different.

2. The modulator according to claim 1 wherein the coupled quantum well structures of the first and second PIN devices each have a well/barrier structure selected from the group consisting of InGaAs/InP, InGaAsP/InGaAsP, InGaAlAs/InP, GaAs/AlGaAs and InGaAlAs/InGaAlAs.

3. The modulator according to claim 1 wherein the modulator is an analog modulator that intensity modulates the optical signal with the amplitude of the RF signal.

4. A semiconductor PIN modulator for modulating an optical signal with an RF signal, said modulator comprising:
    a substrate;
    a first PIN device formed on the substrate and including a P-type layer, an intrinsic layer and an N-type layer, said intrinsic layer of the first PIN device including a coupled quantum well structure, said coupled quantum well structure of the instrinsic layer of the first PIN device having an electro-refraction curve that includes both a positive and negative slope; and
    a second PIN device formed on the substrate and including a P-type layer, an intrinsic layer and an N-type layer, said intrinsic layer of the second PIN device including a coupled quantum well structure, said coupled quantum well structure of the intrinsic layer of the second PIN device having an electro-refraction curve that includes both a positive and negative slope, said first PIN device and said second PIN device being part of an interferometer that operates in a push-pull manner, wherein the modulator is an analog modulator that intensity modulates the optical signal with the amplitude of the RF signal.

5. The modulator according to claim 4 further comprising a biasing system, said biasing system including a first DC bias source applying a first DC bias signal to the intrinsic layer of the first PIN device, a second DC bias source applying a second DC bias signal to the intrinsic layer of the second PIN device, and an RF signal source providing the RF signal in phase to the intrinsic layers of the first and second PIN devices.

6. The modulator according to claim 5 wherein the first and second DC bias signals are different.

7. The modulator according to claim 4 wherein the coupled quantum well structures of the first and second PIN devices have a well/barrier structure selected from the group consisting of InGaAs/InP, InGaAsP/InGaAsP, InGaAlAs/InP, GaAs/AlGaAs and InGaAlAs/InGaAlAs.

8. A method of modulating an optical signal with an RF signal, said method comprising the steps of:

providing a first PIN device formed on a substrate, said first PIN device including a P-type layer, an intrinsic layer and an N-type layer, said intrinsic layer of the first PIN device including a coupled quantum well structure, said coupled quantum well structure of the intrinsic layer of the first PIN device having an electro-refraction curve that includes both a positive and negative slope;

providing a second PIN device formed on the substrate, said second PIN device including a P-type layer, an intrinsic layer and an N-type layer, said intrinsic layer of the second PIN device including a coupled quantum well structure, said coupled quantum well structure of the intrinsic layer of the second PIN device having an electro-refraction curve that includes both a positive and negative slope;

propagating the optical signal through the first and second PIN devices;

applying a first DC bias signal to the intrinsic layer of the first PIN device so that the intrinsic layer of the first PIN device operates on one of the positive or negative slope of the electro-refraction curve of the intrinsic layer of the first PIN device;

applying a second DC bias signal to the intrinsic layer of the second PIN device so that the intrinsic layer of the second PIN device operates on the other of the positive or negative slope of the electro-refraction curve of the intrinsic layer of the second PIN device, where the first and second DC bias signals are different; and applying a RF signal in phase to the intrinsic layers of the first and second PIN devices.

9. The method according to claim 8 wherein the steps of providing a first PIN device and a second PIN device include providing coupled quantum well structures in the intrinsic layers that have a well/barrier structure selected from the group consisting of InGaAs/InP, InGaAsP/InGaAsp, InGaAlAs/InP, GaAs/AlGaAs, and InGaAlAs/InGaAlAs.

10. The method according to claim 8 wherein the RF signal intensity modulates the optical signal.

* * * * *